United States Patent [19]

Sano et al.

[11] Patent Number: 4,840,843
[45] Date of Patent: Jun. 20, 1989

[54] MAGNETIC RECORDING MEDIUM

[75] Inventors: Kunihiko Sano; Makoto Nagao; Akira Nahara; Yasuo Nishikawa; Hiroyuki Iwasaki, all of Kanagawa, Japan

[73] Assignee: Fuji Photo Film Co., Ltd., Kanagawa, Japan

[21] Appl. No.: 109,377

[22] Filed: Oct. 19, 1987

[30] Foreign Application Priority Data

| Oct. 17, 1986 [JP] | Japan | 61-247109 |
| Jan. 19, 1987 [JP] | Japan | 62-9540 |
| Jan. 20, 1987 [JP] | Japan | 62-10179 |
| Mar. 6, 1987 [JP] | Japan | 62-51659 |

[51] Int. Cl.$^4$ ............................................. G11B 5/64
[52] U.S. Cl. ................................... 428/336; 427/131; 428/408; 428/694; 428/695; 428/900
[58] Field of Search ............... 428/408, 695, 422, 694, 428/900, 336; 427/131

[56] References Cited

U.S. PATENT DOCUMENTS

| Re. 32,464 | 7/1987 | Aine | 427/131 |
| 4,411,963 | 10/1983 | Aine | 427/131 |
| 4,503,125 | 3/1985 | Nelson | 427/132 |
| 4,554,217 | 11/1985 | Grimm | 428/900 |
| 4,647,507 | 3/1987 | Suzuki | 427/131 |
| 4,677,023 | 6/1987 | Ishizaki | 427/131 |
| 4,696,845 | 9/1987 | Yanagisawa | 428/422 |

FOREIGN PATENT DOCUMENTS

| 258727 | 12/1985 | Japan . |
| 96512 | 5/1986 | Japan . |
| 126627 | 6/1986 | Japan . |
| 18624 | 1/1987 | Japan . |

Primary Examiner—Paul J. Thibodeau
Attorney, Agent, or Firm—Sughrue, Mion, Zinn, Macpeak & Seas

[57] ABSTRACT

A magnetic recording medium is described, comprising a non-magnetic support having provided thereon a thin magnetic metal film and a protective layer mainly comprising carbon having a graphite structure containing at least one element selected from the group consisting of Mn, Mo, Nb, Ta, Ti, V, Cr and W.

12 Claims, No Drawings

MAGNETIC RECORDING MEDIUM

FIELD OF THE INVENTION

The present invention relates to a magnetic recording medium, and more particularly it relates to a thin metal film type magnetic recording medium having good running durability.

BACKGROUND OF THE INVENTION

As magnetic recording media have recently been used for increasingly high density recording, the so-called thin metal film type magnetic recording media have drawn increasing attention, instead of coated type magnetic recording media.

However, it is difficult to add a lubricating agent and an abrasive agent into a magnetic layer of a thin metal film type magnetic recording medium such as is typically done in coated type magnetic recording media. Therefore, thin metal film type magnetic recording media have shown poor durability, and in the case of a perpendicular magnetic recording disk having a Co-Cr alloy film, cohesion between the alloy film and a magnetic head usually takes place after about 100 passes and running cannot be continued.

It has been proposed to remove the above problem that a liquid lubricating agent is coated on the surface of a magnetic layer and that a solid protective layer is provided on the surface of a magnetic layer. Particularly, provision of a protective layer mainly comprised of carbon as a solid lubricating agent on the surface of a magnetic layer is effective to improve running durability, as disclosed in Japanese Patent Publication No. 33521/79.

However, such has still been insufficient to provide a fully satisfactory protective layer. The reason is believed to be that the dust and contaminants present on a magnetic head increase the friction coefficient between the head and a protective layer.

Further, it has also been proposed to include transition metal elements, boron, or silicon in a diamond type carbon protective layer, as disclosed in Japanese Patent Application (OPI) No. 29936/85 (the term "OPI" as used herein refers to a "published unexamined Japanese patent application"). However, lubricating properties are poor, and therefore sufficient durability still cannot be obtained.

SUMMARY OF THE INVENTION

Thus, an object of the present invention is to provide a thin metal film type magnetic recording medium with a magnetic head free from dust and contaminants and having excellent lubricating properties as well as remarkably improved running durability.

In accordance with the present invention, it has been found that the foregoing objects can be achieved by a magnetic recording medium comprising a non-magnetic support having provided thereon a thin magnetic metal film and a protective layer mainly comprising carbon having a graphite structure containing at least one element selected from the group consisting of Mn, Mo, Nb, Ta, Ti, V, Cr and W.

DETAILED DESCRIPTION OF THE INVENTION

The above-described problems can be overcome by providing a protective layer mainly comprising carbon having a graphite structure containing at least one element selected from the group consisting of Mn, Mo, Nb, Ta, Ti, V, Cr and W on the surface of a magnetic layer of a non-magnetic support. Further, a thin metal film type magnetic recording medium having better lubricating properties, capable of providing a cleaner head with reduced dust and contaminants, can be obtained by providing a lubricating layer mainly comprising an organic compound having a mercapto group, a phosphate compound, or a fluorine type lubricating agent on a surface of a protective layer. That is, lubricating properties can be improved by a protective layer mainly comprising graphite carbon, and dust and contaminants can be substantially prevented on a magnetic head by providing the lubricating layer, thereby reducing increase of friction coefficient and improving running durability.

The protective layer mainly comprising carbon having a graphite structure referred to herein means an amorphous film having a graphite structure prepared by a vacuum deposition method or a sputtering method as described in *Thin Solid Films*, Vol. 122, pages 203–216 (1984). That is, when the amorphous film is analyzed by an X-ray diffraction method, a clear peak (i.e., a peak due to a crystallized carbon black) cannot be seen, and values of plasmon loss energy of carbon obtained by an X-ray electron spectroscopy (XPS) are those which are obtained by the amorphous film having the graphite structure.

The amount of Mn, Mo, Nb, Ta, Ti, V, Cr, and/or W contained in a protective layer mainly comprising carbon having a graphite structure is 10 wt % or less, preferably from 0.5 to 10 wt %, and particularly preferably from 0.5 to 5 wt %, based on the total weight of the protective layer.

Ferromagnetic metals such as Fe, Co or Ni or ferromagnetic alloys such as Fe-Co, Fe-Ni, Co-Ni, Fe-Si, Co-Cr, Co-V, Co-Sm, Co-Pt, Co-P, Co-Ni-P, or Fe-Cr-Co can be used as a ferromagnetic particles of the present invention. And further, metal elements other than the above metals and alloys may be added in a slight amount to the thin magnetic metal film of the present invention.

Suitable non-magnetic supports include high molecular weight films such as polyethylene terephthalate, polyimide or polyamide, high molecular weight disks such as polycarbonate, or polymethyl methacrylate, ceramics such as glass, and metals such as aluminum. The shape of the supports may be any one of a sheet, a card, a disk, a drum, or a tape. The thickness of the support is generally from 5 to 200 μm.

The magnetic recording medium in accordance with the present invention can be prepared by methods comprising forming on a non-magnetic support a thin magnetic metal film by a vacuum evaporation method, a sputtering method, an ion-plating method, or a metal-plating method as described in *Thin Solid Films*, Vol. 122, pages 203–216 (1984), and then forming thereon a protective layer mainly comprising carbon having a graphite structure containing at least one element selected from the group consisting of Mn, Mo, Nb, Ta, Ti, V, Cr, and W by a vacuum evaporation method or a sputtering method, and further providing thereon a lubricating layer mainly comprising organic compounds having a mercapto group, phosphate compounds, or fluorine lubricating agents.

In this case, a magnetic layer can be a laminated layer using two different types of magnetic particles of the present invention or can be a single layer having an undercoating layer. Further, a laminated layer may have an intermediate layer. In any case, the thickness of the magnetic layer is preferably from 0.1 to 2 $\mu$m, and more preferably from 0.12 to 0.3 $\mu$m.

If the protective layer is too thick, electromagnetic properties deteriorate due to spacing loss between the magnetic head and the magnetic medium, whereby sufficient output cannot be obtained upon recording and reproducing performances. On the other hand, if the protective layer is too thin, running durability can not be improved. Therefore, the suitable thickness of the protective layer is generally from 10 to 1,000 Å, and preferably from 50 to 200 Å.

The compounds used in the lubricating layer according to the present invention include organic compounds having a mercapto group, preferably alkylmercaptan such as tetradecyl mercaptan, hexadecyl mercaptan, or octadecyl mercaptan, and heterocyclic compounds substituted with a mercapto group, such as mercaptobenzimidazole derivatives or thiobarbituric acid derivatives, and more preferably organic compounds having a mercapto group and an ester bond in a molecule as described below.

The compounds having a mercapto group and an ester bond therein include monoesters or diester compounds such as behenyl $\beta$-mercaptopropionate, octadecyl $\beta$-mercaptopropionate, dodecyl $\beta$-mercaptopropionate, octyl $\beta$-mercaptopropionate, methyl $\beta$-mercaptopropionate, oleyl $\beta$-mercaptopropionate, behenyl thioglycolate, octadecyl thioglycolate, dodecyl thioglycolate, octyl thioglycolate, methyl thioglycolate, oleyl thioglycolate, behenyl thiosalicylate, octadecyl thiosalicylate, dodecyl thiosalicylate, octyl thiosalicylate, methyl thiosalicylate, oleyl thiosalicylate, 2-mercaptoethyl stearate, 2-mercaptoethyl oleate, 2-mercaptoethyl myristate, 2-mercaptoethyl laurate, di-2-mercaptoethyl maleate, 2-mercaptoethyl propionate, dioctadecyl thiomalete, or dihexadecyl thiomalate and further include oligoester compounds and polyester compounds having a mercapto group.

Suitable phosphate compounds used in the present invention include these phosphate compounds having an alkyl group having 10 or more carbon atoms (particularly preferably from 10 to 22 carbon atoms) and preferably these phosphate compounds having a saturated aliphatic group having 12 or more carbon atoms (particularly preferably from 12 to 22 carbon atoms), and can be any one of monoesters, diesters and triesters.

The suitable phosphate compounds include aliphatic esters such as tri-n-octadecyl phosphate (tristearyl phosphate), trihexadecyl phosphate, tridodecyl phosphate, trioctyl phosphate, tri-n-butyl phosphate, trioleyl phosphate, di-n-octadecyl phosphate, didodecyl phosphate, diisopropyl phosphate, dioleyl phosphate or dihexadecyl phosphate, and aromatic phosphates such as triphenyl phosphate, tricresyl phosphate, diphenyl phosphate or dicresyl phosphate. Preferred compounds among them are tri-n-octadecyl phosphate (tristearyl phosphate), trihexadecyl phosphate, tridodecyl phosphate, trioleyl phosphate, di-n-octadecyl phosphate, didodecyl phosphate, dioleyl phosphate and dihexadecyl phosphate, and further tri-n-octadecyl phosphate (tristearyl phosphate) is the most preferred.

The fluorine type lubricating agents used in the present invention include compounds having perfluoroalkyl groups or perfluoroalkenyl groups, perfluoroalkylene oxide polymers and derivatives thereof, and a polymer or copolymer of fluorine-substituted ethylene.

The specific examples of compounds having perfluoroalkyl groups or perfluoroalkenyl groups include carboxylic acids, alcohols, ester compounds, mercaptans, nonionic surface active agents, cationic surface active agents, anionic surface active agents, and amphoteric surface active agents, all of which have perfluoroalkyl groups or perfluoroalkenyl groups.

The specific examples of perfluoroalkylene oxide polymer and derivatives thereof include perfluoropropylene polymer, perfluoroethylene-perfluoromethylene copolymer, perfluoropropylene-perfluoromethylene copolymer and those having bonded a polar group at the end of the molecules.

The specific examples of a polymer or copolymer of fluorine-substituted ethylene include polytetrafluoroethylene, polytrifluoroethylene, poly-1,1-difluoroethylene (polyfluorovinylidene) and trifluoroethylene-1,1-difluoroethylene copolymer.

The lubricating layer provided on the surface of a thin ferromagnetic metal film of the present invention may contain commonly used lubricating agents in addition to the above-described phosphate compounds, fluorine type lubricating agents, and compounds having a mercapto group. The additive amounts of commonly used lubricating agents are generally from 0 to 90 wt %, preferably from 0 to 70 wt %, and more preferably from 0 to 50 wt %, based on the total weight of the lubricating layer.

The lubricating agents which can be added in addition to the compound having a mercapto group, phosphate compounds and fluorine type lubricating agents include fatty acids, metal soaps, fatty acid amides, fatty acid esters, higher aliphatic alcohols, monoalkyl phosphate, dialkyl phosphate, trialkyl phosphate, paraffins, silicon oil, animal and vegetable oils, mineral oil, higher aliphatic amines; inorganic particles such as graphite, silica, molybdenum disulfide or tungsten disulfide; resin particles such as polyethylene, polypropylene, polyvinyl chloride, copolymer of ethylene and vinyl chloride or polytetrafluoroethylene; $\alpha$-olefin polymer, and unsaturated aliphatic hydrocarbons which are liquid at a normal temperature, and fluorocarbon.

The method for forming a lubricating layer are a method which comprises dissolving materials in organic solvents, coating or spraying the resulting solution on a support and then drying it; a method which comprises melting materials and then coating the melt on a support; a method which comprises dissolving materials in organic solvents and immersing the support therein to adsorb the materials onto the surface of the support, and the Langmuir-Brodgett method which comprises forming a single molecular layer of the materials. These methods are described in U.S. Pat. Nos. 4,152,469, 4,333,985 and 4,390,601.

If the lubricating layer is too thick, electromagnetic properties deteriorate due to spacing loss between a magnetic head and the magnetic medium, while if it is too thin, running durability cannot be improved. Therefore, the thickness of the lubricating layer (the thickness is referred to herein in terms of content) is preferably from 0.5 mg/m$^2$ to 100 mg/m$^2$, preferably from 2 mg/m$^2$ to 20 mg/m$^2$.

The present invention will be illustrated in more detail by the following Examples and Comparative Examples, but is not limited thereto. In Examples and Comparative Examples, all parts are parts by weight, unless otherwise mentioned.

EXAMPLE I

(EXAMPLES I-1 to I-34, COMPARATIVE EXAMPLES I-1 to I-8)

A polyimide film having a thickness of 50 μm was used as a non-magnetic support.

A thin film of CoCr (Co: 80 atom %) having a thickness of 2,500 Å was formed on the non-magnetic support by a sputtering method using CoCr as a target in an Ar gas under $5\times10^{-3}$ Torr.

Various protective layers having a thickness of 200 Å mainly comprising carbon having a graphite structure containing at least one element such as Mn, Mo, Nb, Ta, Ti, V or W in an amount of 4.5 wt % were formed on the above-described CoCr thin film by a sputtering method, putting pellets of Mn, Mo, Nb, Ta, Ti, V or W on the graphite target in an Ar gas under $5\times10^{-3}$ Torr.

The resulting films were cut into disks having a 3.5 inch diameter, and were enclosed with commercially available disk jackets.

Recording was conducted using a commercially available floppy disk drive. Thereafter, the disks were rotated at 600 rpm while monitoring reproduced signals and friction coefficient. Running durability was then evaluated by counting the number of running passes until the coefficient of friction abruptly increased.

The contents of the above elements were measured by the peak ratios of differential spectrum of each element and carbon measured by Auger Electron Spectroscopic Analysis. Accordingly, it was also confirmed in the above manner that there was no change regarding the composition of elements of the protective layers in the direction of the film thickness.

For comparison, a magnetic recording medium having a protective layer of 200 Å thickness mainly comprising carbon having a graphite structure without containing the elements described above was prepared as a comparative sample.

The results are shown in Tables I-1 to I-8. It is apparent from these tables that the magnetic recording media having a protective layer mainly comprising carbon containing Mn, Mo, Nb, Ta, Ti, V or W in a proper amount exhibit better running durability than the magnetic recording media having a protective layer mainly containing carbon without the above-described elements. As a result of observation of the magnetic head by a microscope, it was found that in the case of the magnetic recording medium containing metals in a large amount and having poor running durability, dust and contaminants were not present, but there were scratches on a magnetic head, in the case of the medium having good running durability, dust and contaminants were not present nor scratches on the head, and that in the case of the medium containing no metals, dust and contaminants were present but no scratches.

TABLE I

| Example No. | Metals Contained | Content (wt %) | Running Durability (number of running passes) |
|---|---|---|---|
| Comparative Example I-1 | Mn | 15.4 | $10 \times 10^4$ |
| Example I-1 | Mn | 9.8 | $120 \times 10^4$ |
| Example I-2 | Mn | 5.0 | $220 \times 10^4$ |
| Example I-3 | Mn | 1.2 | $200 \times 10^4$ |
| Example I-4 | Mn | 0.6 | $240 \times 10^4$ |
| Comparative Example I-2 | — | — | $20 \times 10^4$ |
| Comparative Example I-3 | Mo | 13.3 | $8 \times 10^4$ |
| Example I-5 | Mo | 9.7 | $140 \times 10^4$ |
| Example I-6 | Mo | 4.5 | $160 \times 10^4$ |
| Example I-7 | Mo | 1.4 | $180 \times 10^4$ |
| Example I-8 | Mo | 0.8 | $200 \times 10^4$ |
| Comparative Example I-4 | Nb | 15.2 | $12 \times 10^4$ |
| Example I-9 | Nb | 8.8 | $100 \times 10^4$ |
| Example I-10 | Nb | 4.7 | $200 \times 10^4$ |
| Example I-11 | Nb | 1.8 | $200 \times 10^4$ |
| Example I-12 | Nb | 0.5 | $200 \times 10^4$ |
| Comparative Example I-5 | Ta | 14.8 | $14 \times 10^4$ |
| Example I-13 | Ta | 8.6 | $120 \times 10^4$ |
| Example I-14 | Ta | 4.7 | $200 \times 10^4$ |
| Example I-15 | Ta | 2.1 | $240 \times 10^4$ |
| Example I-16 | Ta | 0.6 | $220 \times 10^4$ |
| Comparative Example I-6 | Ti | 13.7 | $10 \times 10^4$ |
| Example I-17 | Ti | 8.9 | $100 \times 10^4$ |
| Example I-18 | Ti | 4.4 | $240 \times 10^4$ |
| Example I-19 | Ti | 1.5 | $220 \times 10^4$ |
| Example I-20 | Ti | 0.8 | $180 \times 10^4$ |
| Comparative Example I-7 | V | 14.4 | $16 \times 10^4$ |
| Example I-21 | V | 10.0 | $200 \times 10^4$ |
| Example I-22 | V | 5.0 | $600 \times 10^4$ or more |
| Example I-23 | V | 1.6 | $600 \times 10^4$ or more |
| Example I-24 | V | 0.5 | $600 \times 10^4$ or more |
| Comparative Example I-8 | W | 13.6 | $14 \times 10^4$ |
| Example I-25 | W | 9.8 | $160 \times 10^4$ |
| Example I-26 | W | 4.9 | $400 \times 10^4$ |
| Example I-27 | W | 1.9 | $500 \times 10^4$ |
| Example I-28 | W | 0.7 | $360 \times 10^4$ |
| Example I-29 | V<br>W | 2<br>3 | $600 \times 10^4$ |
| Example I-30 | V<br>W | 0.4<br>0.3 | $250 \times 10^4$ |
| Example I-31 | V<br>W | 8<br>1 | $220 \times 10^4$ |
| Example I-32 | Ti<br>W | 0.4<br>0.2 | $180 \times 10^4$ |
| Example I-33 | Ti<br>W | 4<br>1 | $250 \times 10^4$ |
| Example I-34 | Ti<br>W | 7<br>1 | $200 \times 10^4$ |

EXAMPLE II

(EXAMPLES II-1 to II-21, COMPARATIVE EXAMPLES II-1 to II-4)

A polyimide film having a thickness of 50 μm was used as a non-magnetic support.

A thin film of CoCr (Co: 80 atom %) having a thickness of 2,500 Å was formed on the non-magnetic support by a sputtering method using CoCr as a target in an Ar gas under $5\times10^{-3}$ Torr.

Various protective layers having a thickness of 200 Å mainly comprising carbon having a graphite structure containing at least one element such as Mn, Mo, Nb, Ta, Ti, V or W in an amount of 4.5 wt % were formed on the above-described CoCr thin film by a sputtering method, putting pellets of Mn, Mo, Nb, Ta, Ti, V or W on the graphite target in an Ar gas under $5\times10^{-3}$ Torr.

Various lubricating agents were dissolved in methyl ethyl ketone and were coated, and then dried, and thus lubricating layers having a coated amount (i.e., content) of 10 mg/m² were formed.

The resulting films were cut to form disks having 3.5 inch diameter and were enclosed in commercially available disk jackets.

Recording was conducted using a commercially available floppy disk drive. Thereafter, the disks were rotated at 600 rpm, while monitoring reproduced signals and the coefficient of friction. Running durability was then evaluated by counting the number of running passes until the coefficient of friction abruptly increased.

The content of Mn, Mo, Nb, Ta, Ti, V and W were measured by the peak ratios of differential spectrum of each element and carbon measured by Auger Electron Spectroscopic Analysis. Accordingly, it was also confirmed in the above manner that there was no change regarding the composition of elements of the protective layers in the direction of film thickness.

For comparison, magnetic recording media having a protective layer with 200 Å thickness mainly comprising carbon having a graphite structure without containing Mn, Mo, Nb, Ta, Ti, V or W, with or without lubricating layers using commonly used fatty acid type lubricating agents, were prepared in the same manner as in the above Example, and were designated as Comparative Examples II-1 to II-4.

With each examples, compositions, amounts used, and the results are shown in Tables II-1 to II-7. It is clearly seen from these tables that a magnetic recording medium having a protective layer mainly comprising carbon having a graphite structure containing Mn, Mo, Nb, Ta, Ti, V and W in a proper amount and further having thereon a lubricating layer mainly comprising organic compounds having a mercapto group exhibits better running durability than the medium having a protective layer mainly comprising carbon having a graphite structure without containing the above elements, with or without a lubricating layer containing commonly used fatty acid type lubricating agents. As a result of observation of a magnetic head by a microscope, it was confirmed that in the case of the magnetic medium having excellent running durability, there were no dust and contaminants nor scratches on the head.

TABLE II

| Example No. | Metal Contained in Protective Layer (wt %) | Lubricating Layer | Number of Running Passes |
|---|---|---|---|
| Example II-1 | Mn, 3.0 | Octadecyl thioglycolate | 280 × 10⁴ |
| Example II-2 | Mn, 0.6 | Octadecyl thiosalicylate | 240 × 10⁴ |
| Example II-3 | Mn, 5.0 | Octadecyl thiomalate | 260 × 10⁴ |
| Example II-4 | Mo, 0.6 | Octadecyl thioglycolate | 220 × 10⁴ |
| Example II-5 | Mo, 2.0 | Octadecyl thiosalicylate | 180 × 10⁴ |
| Example II-6 | Mo, 3.0 | Octadecyl thiomalate | 200 × 10⁴ |
| Example II-7 | Nb, 5.0 | Octadecyl thioglycolate | 210 × 10⁴ |
| Example II-8 | Nb, 3.0 | Octadecyl thiosalicylate | 170 × 10⁴ |
| Example II-9 | Nb, 0.7 | Dioctadecyl thiomalate | 190 × 10⁴ |
| Example II-10 | Ta, 1.0 | Octadecyl thioglycolate | 480 × 10⁴ |
| Example II-11 | Ta, 8.0 | Octadecyl thiosalicylate | 440 × 10⁴ |
| Example II-12 | Ta, 3.0 | Dioctadecyl thiomalate | 460 × 10⁴ |
| Example II-13 | Ti, 1.0 | Octadecyl thioglycolate | 260 × 10⁴ |
| Example II-14 | Ti, 5.0 | Octadecyl thiosalicylate | 220 × 10⁴ |
| Example II-15 | Ti, 3.0 | Dioctadecyl thiomalate | 210 × 10⁴ |
| Example II-16 | V, 0.5 | Octadecyl thioglycolate | 710 × 10⁴ |
| Example II-17 | V, 9.0 | Octadecyl thiosalicylate | 670 × 10⁴ |
| Example II-18 | V, 5.0 | Dioctadecyl thiomalate | 690 × 10⁴ |
| Example II-19 | W, 3.0 | Octadecyl thioglycolate | 590 × 10⁴ |
| Example II-20 | W, 2.0 | Octadecyl thiosalicylate | 550 × 10⁴ |
| Example II-21 | W, 4.0 | Dioctadecyl thiomalate | 570 × 10⁴ |
| Comparative Example II-1 | — | — | 20 × 10⁴ |
| Comparative Example II-2 | V, 5.0 | Stearic acid | 150 × 10⁴ |
| Comparative Example II-3 | V, 5.0 | Myristic acid | 110 × 10⁴ |
| Comparative Example II-4 | V, 5.0 | Butyl stearate | 120 × 10⁴ |

EXAMPLE III (EXAMPLES III-1 to III-35, COMPARATIVE EXAMPLES III-1 to III-4)

A polyimide film having a thickness of 50 μm was used as a non-magnetic support.

A thin film of CoCr (Co: 80 atom %) having a thickness of 2,500 Å was formed on the non-magnetic support by a sputtering method using CoCr as a target in an Ar gas under $5 \times 10^{-3}$ Torr.

Various protective layers having a thickness of 200 Å mainly comprising carbon having a graphite structure containing each element such as Mn, Mo, Nb, Ta, Ti, V or W were formed on the above-described CoCr thin film by a sputtering method, putting pellets of Mn, Mo, Nb, Ta, Ti, V or W on the graphite target in an Ar gas under $5 \times 10^{-3}$ Torr.

Various lubricating agents were dissolved in methyl ethyl ketone and were coated, and then dried, and thus lubricating layers having a coated amount (i.e., content) of 15 mg/m² were formed.

The resulting films were cut to form disks having 3.5 inch diameter, and were enclosed in commercially available disk jackets.

Recording was conducted using a commercially available floppy disk drive. Thereafter, the disks were rotated at 600 rpm, while monitoring reproduced signals and the coefficient of friction. Running durability was then evaluated by counting the number of running passes until the coefficient of friction abruptly increased.

The contents of the above elements were measured by the peak ratios of differential spectrum of each element and carbon measured by Auger Electron Spectroscopic Analysis. Accordingly, it was also confirmed in the above manner that there was no change regarding the composition of elements of the protective layers in the direction of the film thickness.

For comparison, magnetic recording media having a protective layer of 200 Å thickness mainly comprising carbon having a graphite structure without containing Mn, Mo, Nb, Ta, Ti, V and W with or without lubricating layers using commonly used fatty acid type lubricating agents were prepared, and were designated as Comparative Examples III-1 to III-4.

Regarding each example, compositions, amounts used, and the results are shown in Tables III-1 to III-7. It is clearly seen from the tables that a magnetic recording medium having a protective layer mainly comprising carbon having a graphite structure containing Mn, Mo, Nb, Ta, Ti, V and W in a proper amount and further having thereon a lubricating layer mainly comprising phosphate compounds exhibits better running durability than the medium having a protective layer mainly comprising carbon having a graphite structure without containing the above elements and with or without a lubricating layer containing commonly used fatty acid type lubricating agents. As a result of observation of a magnetic head by a microscope, it was confirmed that there were no dust and contaminants, nor scratches on the head in the case of the noted magnetic recording medium having excellent running durability.

TABLE III

| Example No. | Metal Contained in Protective Layer (wt %) | Lubricating Layer | Number of Running Passes |
|---|---|---|---|
| Example III-1 | Mn, 4.9 | Tri-n-octadecyl phosphate | $290 \times 10^4$ |
| Example III-2 | Mn, 0.6 | Tridodecyl phosphate | $250 \times 10^4$ |
| Example III-3 | Mn, 2.5 | Di-n-octadecyl phosphate | $270 \times 10^4$ |
| Example III-4 | Mn, 2.0 | Dioleyl phosphate | $260 \times 10^4$ |
| Example III-5 | Mn, 9.0 | Triphenyl phosphate | $240 \times 10^4$ |
| Example III-6 | Mo, 5.5 | Tri-n-octadecyl phosphate | $230 \times 10^4$ |
| Example III-7 | Mo, 1.0 | Tridodecyl phosphate | $190 \times 10^4$ |
| Example III-8 | Mo, 2.0 | Di-n-octadecyl phosphate | $210 \times 10^4$ |
| Example III-9 | Mo, 6.0 | Dioleyl phosphate | $200 \times 10^4$ |
| Example III-10 | Mo, 9.0 | Triphenyl phosphate | $180 \times 10^4$ |
| Example III-11 | Nb, 2.0 | Tri-n-octadecyl phosphate | $220 \times 10^4$ |
| Example III-12 | Nb, 4.0 | Tridodecyl phosphate | $180 \times 10^4$ |
| Example III-13 | Nb, 3.0 | Di-n-octadecyl phosphate | $200 \times 10^4$ |
| Example III-14 | Nb, 1.0 | Dioleyl phosphate | $190 \times 10^4$ |
| Example III-15 | Nb, 7.0 | Triphenyl phosphate | $170 \times 10^4$ |
| Example III-16 | Ta, 0.6 | Tri-n-octadecyl phosphate | $280 \times 10^4$ |
| Example III-17 | Ta, 1.0 | Tridodecyl phosphate | $240 \times 10^4$ |
| Example III-18 | Ta, 3.0 | Di-n-octadecyl phosphate | $260 \times 10^4$ |
| Example III-19 | Ta, 5.0 | Dioleyl phosphate | $250 \times 10^4$ |
| Example III-20 | Ta, 8.0 | Triphenyl phosphate | $200 \times 10^4$ |
| Example III-21 | Ti, 2.0 | Tri-n-octadecyl phosphate | $270 \times 10^4$ |
| Example III-22 | Ti, 4.0 | Tridodecyl phosphate | $230 \times 10^4$ |
| Example III-23 | Ti, 5.0 | Di-n-octadecyl phosphate | $220 \times 10^4$ |
| Example III-24 | Ti, 6.0 | Dioleyl phosphate | $240 \times 10^4$ |
| Example III-25 | Ti, 0.5 | Triphenyl phosphate | $190 \times 10^4$ |
| Example III-26 | V, 5.0 | Tri-n-octadecyl phosphate | $720 \times 10^4$ |
| Example III-27 | V, 0.5 | Tridodecyl phosphate | $680 \times 10^4$ |
| Example III-28 | V, 9.5 | Di-n-octadecyl phosphate | $700 \times 10^4$ |
| Example III-29 | V, 3.0 | Dioleyl phosphate | $690 \times 10^4$ |
| Example III-30 | V, 2.0 | Triphenyl phosphate | $670 \times 10^4$ |
| Example III-31 | W, 0.5 | Tri-n-octadecyl phosphate | $600 \times 10^4$ |
| Example III-32 | W, 1.0 | Tridodecyl phosphate | $560 \times 10^4$ |
| Example III-33 | W, 4.0 | Di-n-octadecyl phosphate | $580 \times 10^4$ |
| Example III-34 | W, 3.0 | Dioleyl phosphate | $570 \times 10^4$ |
| Example III-35 | W, 9.0 | Triphenyl phosphate | $550 \times 10^4$ |
| Comparative Example III-1 | — | — | $20 \times 10^4$ |
| Comparative Example III-2 | W, 4.0 | Stearic acid | $150 \times 10^4$ |
| Comparative Example III-3 | W, 4.0 | Myristic acid | $130 \times 10^4$ |
| Comparative Example III-4 | W, 4.0 | Butyl stearate | $120 \times 10^4$ |

EXAMPLE IV (EXAMPLES IV-1 to IV-40, COMPARATIVE EXAMPLES IV-1 to IV-4)

A polyimide film having a thickness of 50 μm was used as a non-magnetic support.

A thin film of CoCr (Co: 80 atom %) having a thickness of 2,500 Å was formed on the non-magnetic support by a sputtering method using CoCr as a target in an Ar gas under $5 \times 10^{-3}$ Torr.

By putting pellets of Mn, Mo, Nb, Ta, Ti, V or W on a graphite target in an Ar gas under $5 \times 10^{-3}$ Torr, sputtering was conducted to form various protective layers having a thickness of 200 Å mainly comprising carbon having a graphite structure containing at least one element such as Mn, Mo, Nb, Ta, Ti, V or W on the above-described CoCr thin film.

Various lubricating agents (a) to (e) were dissolved in methyl ethyl ketone, and were coated and dried to form lubricating layers having a coated amount (i.e., content) of 15 mg/m².

Lubricating Agents:
(a) Octadecyl perfluorooctanate
(b) Perfluorononyl alcohol
(c) Perfluorooctyl ethylene oxide adduct (average number of repeating unit of ethylene oxide: 7)
(d) Perfluoroethylene-perfluoromethylene copolymer, FOMBLIN Z 4000" manufactured by Montefluos Co., Ltd.
(e) Trifluoroethylene-1,1-difluoroethylene copolymer The thus-obtained films were cut to form disks having 3.5 inch diameter and were enclosed in commercially available disk jackets as samples.

Recording was conducted using a commercially available floppy disk drive. Thereafter, the disks were rotated at 600 rpm, while monitoring reproduced signals and the coefficient of friction. Running durability was then evaluated under the conditions of $25° \pm 2°$ C. and $30 \pm 5\%$ RH by counting the number of running passes until the coefficient of friction abruptly increased. Whether or not protective layers were peeled off and dust and contaminants were present on a magnetic head were cheked by an optical microscope.

The contents of Mn, Mo, Nb, Ta, Ti, V and W were measured by the peak ratios of differential spectrum of each element and carbon measured by Auger Electron Spectroscopic Analysis. Accordingly, it was also confirmed in the above manner that there was no change regarding the composition of elements of the protective layers in the direction of the film thickness.

For comparison, a magnetic recording medium having a protective layer with 200 Å thickness mainly comprising carbon having a graphite structure without containing Mn, Cr, Mo, Nb, Ta, Ti, V and W and without a lubricating layer was prepared and designated as a sample of Comparative Example IV-1. A medium having only a lubricating layer without being provided with a protective layer mainly comprising carbon having a graphite structure was prepared as a sample of Comparative Example IV-2. A medium having only a protective layer of 200 Å thickness mainly comprising carbon having a graphite structure containing at least one metal without being provided with a lubricating layer was prepared as a sample of Comparative Example IV-3. A medium having a protective layer of 200 Å thickness mainly comprising carbon having a graphite structure without containing metals and having thereon a lubricating layer was prepared as a sample of Comparative Example IV-4.

With regard to each sample, additives in a protective layer, amounts used, kinds of lubricating agents and the results are shown in Tables IV-1 to IV-8. It is clearly seen from these tables that samples having a protective layer mainly comprising carbon having a graphite structure and containing Cr, Mn, Mo, Nb, Ta, Ti, V and W in a proper amount and having thereon a lubricating layer containing fluorine type lubricating agents exhibit better running durability than samples having a protective layer mainly comprising carbon having a graphite structure without containing the metals and those samples having no lubricating layers. As a result of observation of a magnetic head and a film surface by microscope, it was confirmed that there were no dust and contaminants on the head and no scratches on the film surface in the case of samples having excellent running durability.

Dust and contaminants on the head were observed by an optical microscope ($\times 20$).

In the evaluation, A means that dust and contaminants were scarcely present, B means that they were present in a small quantity, and C means that they were present in a great quantity.

Scratches on the film surface were observed by an optical microscope ($\times 160$). In the evaluation, A means that there were hardly any scratches, B means that a few scratches were present, and C means that a significant number of scratches were present.

TABLE IV

| Example No. | Metal Contained in Protective Layer | Metal Content (wt %) | Lubricating Layer | Number of Running Passes | Dust and Contaminants on Magnetic Head Surface | Scratches on Film Surface |
|---|---|---|---|---|---|---|
| Example IV-1 | Cr | 4.0 | (a) | $250 \times 10^4$ | A | A |
| Example IV-2 | Cr | 1.0 | (b) | $200 \times 10^4$ | A | A |
| Example IV-3 | Cr | 2.0 | (c) | $210 \times 10^4$ | A | A |
| Example IV-4 | Cr | 5.1 | (d) | $240 \times 10^4$ | A | A |
| Example IV-5 | Cr | 9.0 | (e) | $190 \times 10^4$ | B | B |
| Comparative Example IV-1 | None (Carbon layer was present) | 0 | None | $20 \times 10^4$ | C | C |
| Example IV-6 | Mn | 4.9 | (a) | $280 \times 10^4$ | A | A |
| Example IV-7 | Mn | 0.6 | (b) | $240 \times 10^4$ | A | A |
| Example IV-8 | Mn | 3.5 | (c) | $260 \times 10^4$ | A | A |
| Example IV-9 | Mn | 2.0 | (d) | $250 \times 10^4$ | A | A |
| Example IV-10 | Mn | 8.8 | (e) | $220 \times 10^4$ | A | A |
| Example IV-11 | Mo | 5.4 | (a) | $220 \times 10^4$ | A | A |
| Example IV-12 | Mo | 1.2 | (b) | $170 \times 10^4$ | B | B |
| Example IV-13 | Mo | 2.3 | (c) | $190 \times 10^4$ | A | B |
| Example IV-14 | Mo | 6.0 | (d) | $200 \times 10^4$ | A | A |
| Example IV-15 | Mo | 8.6 | (e) | $170 \times 10^4$ | B | B |
| Example IV-16 | Nb | 2.0 | (a) | $230 \times 10^4$ | A | A |
| Example IV-17 | Nb | 4.1 | (b) | $190 \times 10^4$ | B | B |
| Example IV-18 | Nb | 3.0 | (c) | $210 \times 10^4$ | A | A |
| Example IV-19 | Nb | 0.9 | (d) | $200 \times 10^4$ | A | A |
| Example IV-20 | Nb | 7.1 | (e) | $180 \times 10^4$ | B | B |
| Example IV-21 | Ta | 0.6 | (a) | $270 \times 10^4$ | A | A |
| Example IV-22 | Ta | 1.0 | (b) | $230 \times 10^4$ | A | A |
| Example IV-23 | Ta | 3.1 | (c) | $260 \times 10^4$ | A | A |
| Example IV-24 | Ta | 5.2 | (d) | $250 \times 10^4$ | A | A |
| Example IV-25 | Ta | 8.1 | (e) | $210 \times 10^4$ | A | B |
| Example IV-26 | Ti | 2.0 | (a) | $250 \times 10^4$ | A | A |
| Example IV-27 | Ti | 3.9 | (b) | $210 \times 10^4$ | A | A |
| Example IV-28 | Ti | 4.8 | (c) | $200 \times 10^4$ | A | A |
| Example IV-29 | Ti | 5.7 | (d) | $220 \times 10^4$ | A | A |
| Example IV-30 | Ti | 0.5 | (e) | $170 \times 10^4$ | B | B |
| Example IV-31 | V | 5.1 | (a) | $700 \times 10^4$ | A | A |
| Example IV-32 | V | 0.5 | (b) | $660 \times 10^4$ | A | A |
| Example IV-33 | V | 9.3 | (c) | $680 \times 10^4$ | A | A |
| Example IV-34 | V | 3.2 | (d) | $670 \times 10^4$ | A | A |
| Example IV-35 | V | 2.4 | (e) | $650 \times 10^4$ | A | A |
| Comparative Example IV-2 | None (Carbon layer | 0 | (a) | $5 \times 10^4$ | B | B |

TABLE IV-continued

| Example No. | Metal Contained in Protective Layer | Metal Content (wt %) | Lubricating Layer | Number of Running Passes | Dust and Contaminants on Magnetic Head Surface | Scratches on Film Surface |
| --- | --- | --- | --- | --- | --- | --- |
| Comparative Example IV-3 | was absent) (Metal V was contained in carbon layer | 5.0 | None | $120 \times 10^4$ | B | B |
| Comparative Example IV-4 | None (Carbon layer was present) | 0 | (d) | $80 \times 10^4$ | C | C |
| Example IV-36 | W | 0.5 | (a) | $580 \times 10^4$ | A | A |
| Example IV-37 | W | 1.0 | (b) | $540 \times 10^4$ | A | A |
| Example IV-38 | W | 4.2 | (c) | $560 \times 10^4$ | A | A |
| Example IV-39 | W | 3.3 | (d) | $550 \times 10^4$ | A | A |
| Example IV-40 | W | 8.7 | (e) | $530 \times 10^4$ | A | A |

It is clearly seen from the above results that the coefficient of friction with a magnetic head can be greatly reduced, dust and contaminants are hardly present on a magnetic head, scratches hardly occur, and running durability can be significantly improved in accordance with the magnetic recording medium of the present invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a thin magnetic metal film and a protective layer mainly comprising carbon having a graphite structure containing at least one element selected from the group consisting of Mn, Mo, Nb, Ta, Ti, V, Cr and W, wherein said at least one element is present in an amount of from 0.5 to 10 wt. % and wherein the thickness of said protective layer is from 10 to 1,000 Å.

2. A magnetic recording medium as in claim 1, wherein a lubricating layer mainly comprising organic compounds having a mercapto group, phosphate compounds, or fluorine type lubricating agents is additionally provided on said protective layer.

3. A magnetic recording medium as in claim 1, wherein said protective layer contains at least one element selected from the group consisting of Mn, Mo, Nb, Ta, Ti, V, Cr and W in an amount of 10 wt % or less.

4. A magnetic recording medium as in claim 1, wherein said protective layer contains at least one element selected from the group consisting of Mn, Mo, Nb, Ta, Ti, V, Cr and W in an amount of from 0.5 to 5 wt %.

5. A magnetic recording medium as in claim 1, wherein the thickness of said protective layer is from 50 to 200 Å.

6. A magnetic recording medium as in claim 2, wherein said lubricating layer mainly comprises an organic compound having a mercapto group, selected from an alkylmercaptan and a heterocyclic compound substituted with a mercapto group.

7. A magnetic recording medium as in claim 2, wherein said lubricating layer mainly comprises an organic compound having a mercapto group and an ester bond in a molecule.

8. A magnetic recording medium as in claim 2, wherein said lubricating layer mainly comprises phosphate compounds having alkyl group having 10 or more carbon atoms.

9. A magnetic recording medium as in claim 2, wherein said lubricating layer mainly comprises phosphate compound having aliphatic group having 12 or more carbon atoms.

10. A magnetic recording medium as in claim 2, wherein said lubricating layer mainly comprises fluorine type lubricating agent selected from compounds having a perfluoroalkyl group or perfluoroalkenyl group, perfluoroalkylene oxide polymers and derivatives thereof, and a polymer or copolymer of fluorine-substituted ethylene.

11. A magnetic recording medium as in claim 2, wherein the thickness of said lubricating layer is from 0.5 to 100 mg/m$^2$.

12. A magnetic recording medium as in claim 2, wherein the thickness of said lubricating layer is from 2 to 20 mg/m$^2$.

* * * * *